United States Patent [19]

Noda

[11] Patent Number: 5,377,441
[45] Date of Patent: Jan. 3, 1995

[54] ROD CLAMP

[75] Inventor: Hideo Noda, Sakai, Japan

[73] Assignee: Shimano Inc., Osaka, Japan

[21] Appl. No.: 926,632

[22] Filed: Aug. 10, 1992

[30] Foreign Application Priority Data

Aug. 13, 1991 [JP] Japan .............. 3-63674[U]

[51] Int. Cl.$^6$ ............................................. A01K 87/06
[52] U.S. Cl. .................................. 43/22; 24/284
[58] Field of Search ............... 29/569, 525, 459, 284;
248/230, 316.4; 43/22; 242/316

[56] References Cited

U.S. PATENT DOCUMENTS

| | | | |
|---|---|---|---|
| 1,321,841 | 11/1919 | Otto | 43/22 X |
| 1,883,041 | 10/1932 | Somers | 43/22 X |
| 2,929,578 | 3/1960 | Hull | 43/22 X |
| 5,012,607 | 5/1991 | Meschkat | 43/22 X |

FOREIGN PATENT DOCUMENTS 2-87465  7/1990  Japan .

*Primary Examiner*—James R. Brittain
*Attorney, Agent, or Firm*—Dickstein, Shapiro & Morin

[57] ABSTRACT

A rod clamp for securing a reel to a rod comprises a clamp member for contacting a reel seat of the rod, a plurality of tightening members for tightening the clamp member to a reel foot of the reel, thereby to fix the reel to the reel seat of the rod sandwiched between the clamp member and reel foot, and a plurality of supporting projections formed of a material different from the clamp member and extending toward the reel seat for contacting the reel seat as does the clamp member. The projections are formed of an elastic material, thereby positively to prevent the reel and rod clamp from moving relative to rod surfaces.

7 Claims, 5 Drawing Sheets

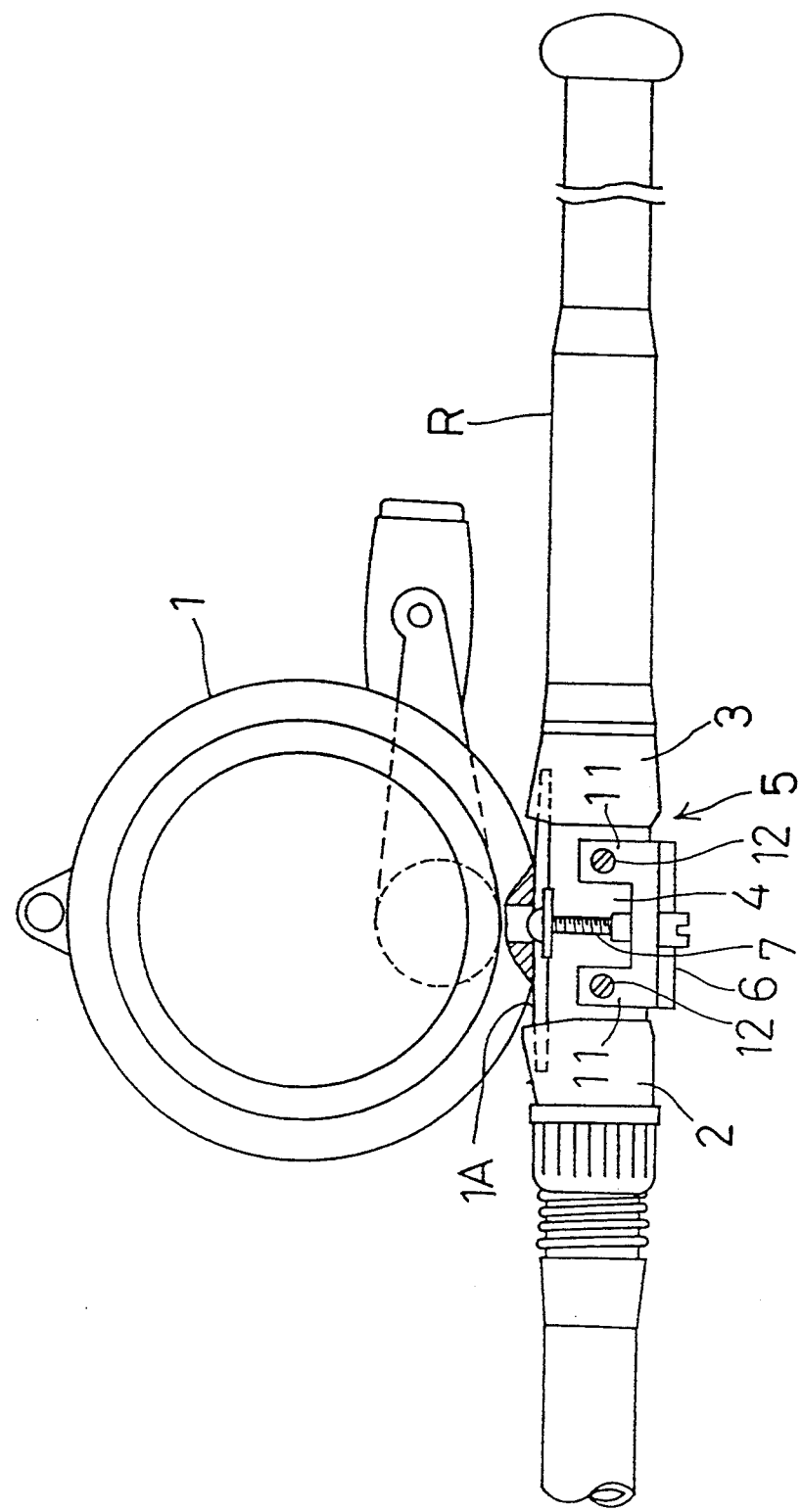

ROD CLAMP

BACKGROUND OF THE INVENTION

1. Field of the Invention

The present invention relates to a rod clamp for firmly attaching a fishing reel such as a trolling reel to a fishing rod by fastening a reel foot of the reel to a predetermined position on a seat base of a reel seat provided on the rod.

2. Description of the Related Art

A conventional rod clamp for securing a reel to a reel seat of a rod is formed of a hard material for rigidly fixing the reel in position. This rod clamp has a hard contacting surface pressed directly against the rod. However, the contacting surface of the clamp formed of a hard material does not closely follow side surfaces of the rod, and does not impart a strong frictional retaining force. Consequently, such a clamp is incapable of reliably preventing the reel from slipping longitudinally and circumferentially of the rod. There is a limit to strength of the rod and the seat base of the reel seat per se. To enhance the fixing effect of the rod clamp by increasing its tightening force is impracticable since this could damage the rod and seat base.

SUMMARY OF THE INVENTION

An object of the present invention is to provide a rod clamp incorporating a simple modification to the surface thereof that contacts the rod, thereby to promote the tightening effect.

The above object is fulfilled, according to the present invention, by a rod clamp comprising clamp means for contacting a reel seat of a rod, a plurality of tightening means for tightening the clamp means to a reel foot of the reel, thereby to fix the reel to the reel seat of the rod sandwiched between the clamp means and the reel foot, and a plurality of supporting projections formed of a material different from the clamp means and extending toward the reel seat for contacting the reel seat as does the clamp means.

In the present invention, a main body of the rod clamp acts to tighten the reel to the rod, while the supporting projections formed on the rod clamp positively prevent the reel from slipping longitudinally and circumferentially of the rod. By employing an elastic material for forming the supporting projections, the supporting projections positively contact the rod while maintaining the contact between the main body of the rod clamp and the rod even if the rod has a varied diameter. Thus, the reel may reliably be secured to rods having varied outer contours.

In other words, the supporting projections having a high coefficient of friction compensate for an insufficient frictional retaining force of the hard main clamp body alone to engage the rod. The supporting projections formed of an elastic material are capable of coping with variations in the outer contour of the rod. The hard main clamp body, in turn, compensates for weakness in tightening action of the supporting projections alone. Thus, the rod clamp according to the present invention has a reliable reel securing structure in which the main clamp body which is little deformable and the supporting projections having a high coefficient of friction and a high degree of elasticity perform a combined action to produce a reliable retaining condition with a light tightening force.

Other objects and features of this invention will be understood from the following description taken with reference to the accompanying drawings.

BRIEF DESCRIPTION OF THE DRAWINGS

FIG. 5 is a side view of the rod clamp of FIG. 4 used to secure the reel to the rod.

DETAILED DESCRIPTION OF THE PREFERRED EMBODIMENTS

Figure 1:
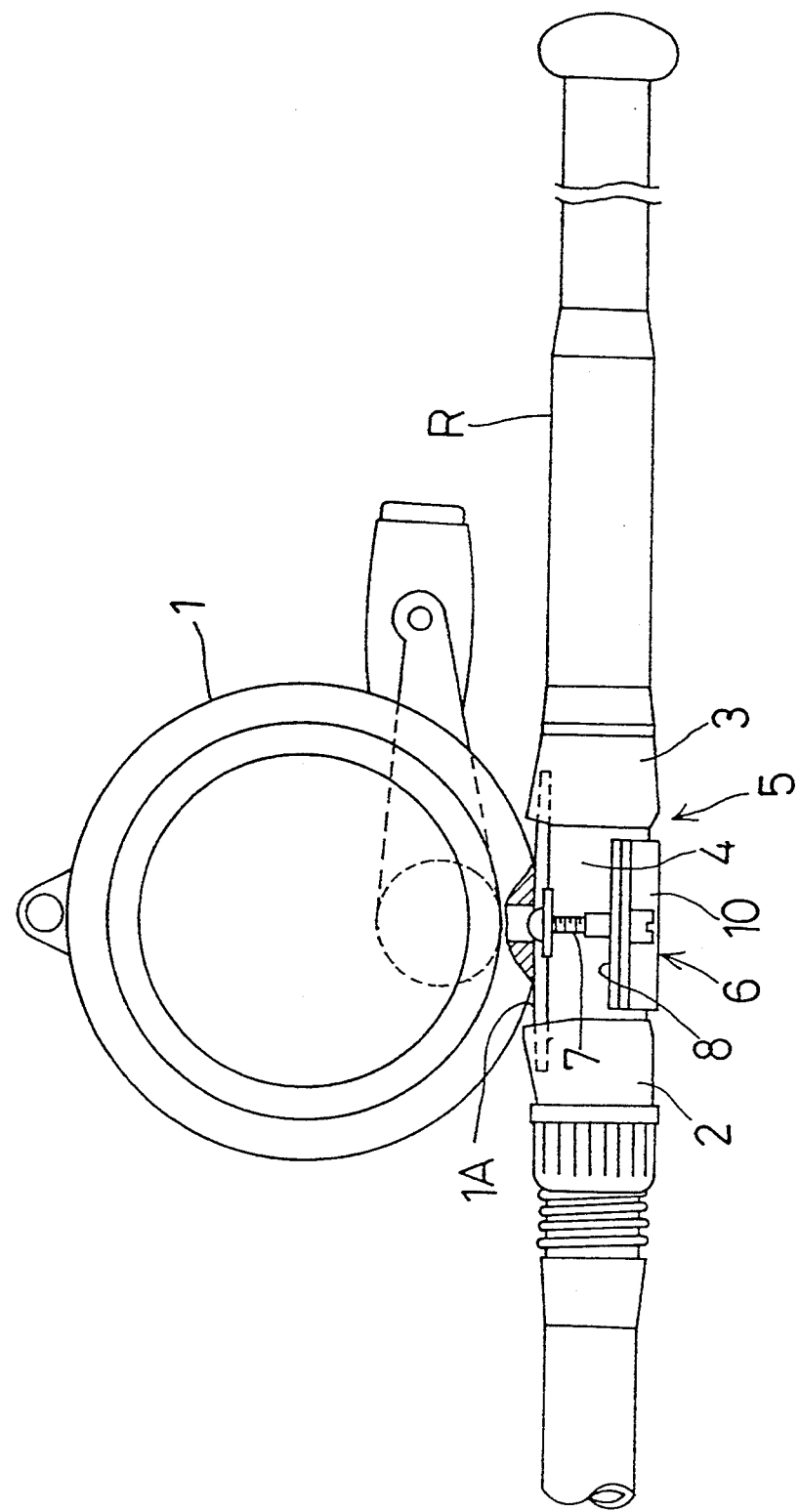
FIG. 1 is a side view of the rod clamp used to secure the reel to the rod.

A rod clamp according to the present invention will be described in relation to a rod R for attaching a trolling reel. As shown in FIG. 1, a reel 1 is attached to a reel seat 5 of the rod including a movable hood 2 for engaging a front end of a reel foot 1A, a fixed hood 3 for engaging a rear end of the reel foot 1A, and a tubular seat base 4 interconnecting the two hoods 2 and 3. When attaching the reel 1 to the rod R, a clamp member 6 of the rod clamp is placed in contact with a lower surface of the reel seat 5, and is connected to the reel foot 1A by means of right and left bolts 7.

Figure 2:
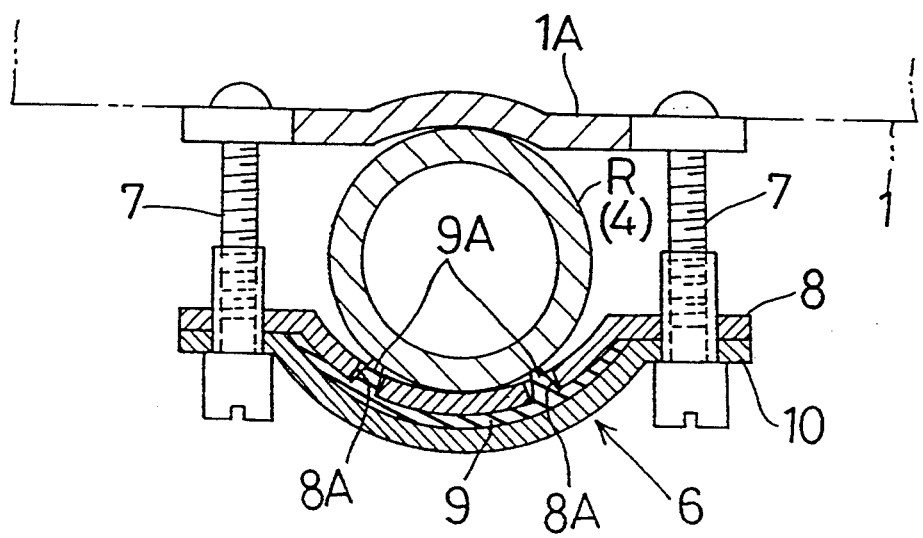
FIG. 2 is a front view in vertical section of a rod clamp according to the present invention which is used to fix a reel foot of a fishing reel to a fishing rod.
Figure 3:
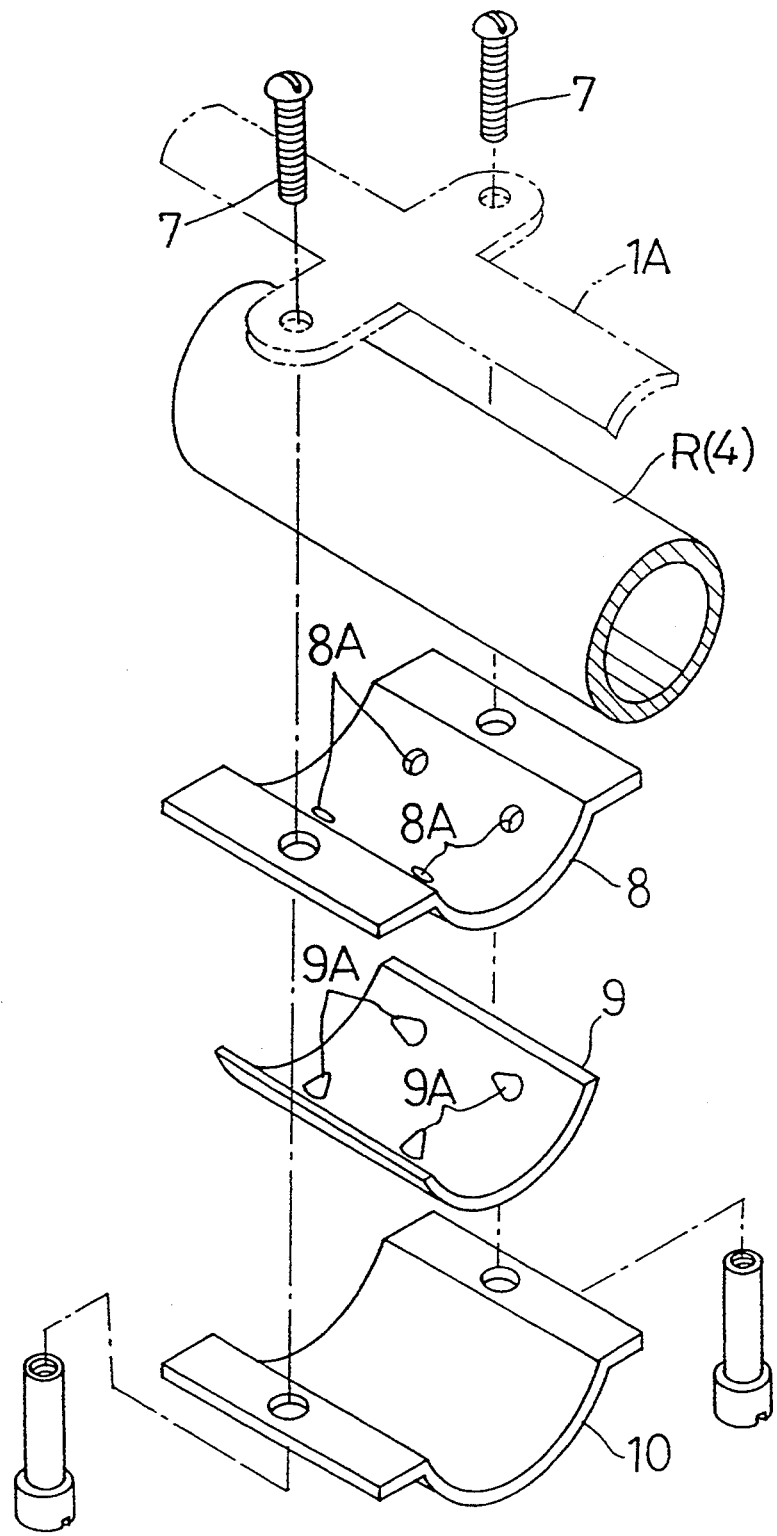
FIG. 3 is an exploded perspective view of the rod clamp, rod and reel foot.

As shown in FIGS. 2 and 3, the clamp member 6 includes a metallic inner piece 8 for contacting the lower surface of the reel seat 5, an intermediate piece 9 formed of hard rubber having a high coefficient of friction, and a metallic outer piece 10. The inner piece 8 and outer piece 10 sandwich the intermediate piece 9 therebetween to form a three-layer structure. The intermediate piece 9 includes four supporting projections 9A formed on an upper surface thereof. The inner piece 8 has four perforations 8A formed in a curved surface thereof and opposed to the supporting projections 9A. When the three pieces are assembled, the supporting projections 9A extend inwardly from the curved surface of the inner piece 8. These supporting projections 9A contact the reel seat 5 to perform an antislip function. The metallic inner and outer pieces 8 and 10 perform a fixing function to reliably hold the reel 1 in place. The inner and outer pieces 8 and 10 constitute the main body of the clamp member 6.

Other embodiments of the present invention will be described next.

Figure 4:
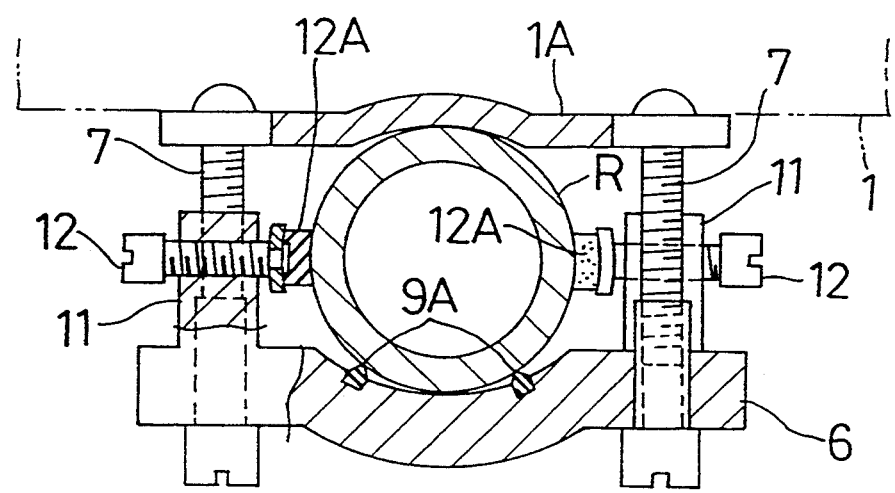
FIG. 4 is a front view in vertical section of a rod clamp in a different embodiment of the present invention which is used to fix a reel foot of a fishing reel to a fishing rod.

(1) As shown in FIGS. 4 and 5, not only is the reel foot 1A fastened to a clamp member 6 by means of bolts 7, but the clamp member 6 includes side flames 11 projecting upward and at least two screw shafts 12 extend horizontally from front and rear positions of each side frame 11. Each screw shaft 12 has a pad 12A mounted on a forward end thereof for contacting a side surface of the reel seat 5 to enhance the reel holding effect. The clamp member 6 may comprise a one-piece element instead of the three-layer structure, with supporting projections 9A fitted in the main body of the clamp member 6 to project toward the reel seat 5.

(2) The supporting projections 9A may be formed of a soft plastic as long as the projections 9A have a greater coefficient of friction than the main body of the clamp member 6.

(3) The reel seat 5 may be a plate-type reel seat.

(4) The objective material the clamp means contact is not necessarily the seat base of the reel seat, but the clamp means can be attached to the naked rod blank portion between a pair of reel fixing hoods when the seat base is not included in the reel seat construction. In such cases the rod clamp according to the present invention less likely damages the rod body by exhibiting its combined effect produced by the hard main clamp body and the elastic supporting projections.

What is claimed is:

1. A rod clamp for securing a reel to a rod, comprising:

first clamp means for contacting a reel seat of the rod, said first clamp means defining a plurality of perforations;

second clamp means substantially fitting on an outer contour of said first clamp means;

an intermediate member formed of an elastic material and sandwiched between said first and second clamp means;

a plurality of supporting projections formed on said intermediate member and extending through said perforations of said first clamp means to extend toward the reel seat; and a plurality of tightening means for tightening said first and second clamp means to a reel foot of the reel, to thereby to fix the reel seat between said first and second clamp means and the reel foot.

2. A rod clamp as claimed in claim 1, wherein said supporting projections are cone-shaped with pointed ends.

3. A rod clamp as claimed in claim 1, wherein said supporting projections are formed of a material having a greater coefficient of friction with said reel seat than said clamp means.

4. A rod clamp as claimed in claim 3, wherein said supporting projections are formed of an elastic material.

5. A rod clamp as claimed in claim 4, wherein said supporting projections are formed of rubber.

6. A rod clamp as claimed in claim 1, wherein said supporting projections are formed of an elastic material.

7. A rod clamp as claimed in claim 1, wherein said supporting projections are formed integral with said intermediate member.

* * * * *